(12) United States Patent
Bronczyk et al.

(10) Patent No.: US 9,203,125 B2
(45) Date of Patent: Dec. 1, 2015

(54) BATTERY CELL ASSEMBLIES

(71) Applicant: LG Chem, Ltd., Seoul (KR)

(72) Inventors: Steven A. Bronczyk, Rochester Hills, MI (US); Kwok Tom, Madison Heights, MI (US); William Koetting, Davisburg, MI (US)

(73) Assignee: LG Chem, Ltd., Seoul (KR)

( * ) Notice: Subject to any disclaimer, the term of this patent is extended or adjusted under 35 U.S.C. 154(b) by 398 days.

(21) Appl. No.: 13/778,916

(22) Filed: Feb. 27, 2013

(65) Prior Publication Data

US 2013/0177797 A1 Jul. 11, 2013

Related U.S. Application Data

(62) Division of application No. 12/857,908, filed on Aug. 17, 2010.

(60) Provisional application No. 61/325,290, filed on Apr. 17, 2010.

(51) Int. Cl.
*H01M 10/50* (2006.01)
*H01M 2/10* (2006.01)
(Continued)

(52) U.S. Cl.
CPC ........ *H01M 10/5032* (2013.01); *H01M 2/1061* (2013.01); *H01M 2/1077* (2013.01); *H01M 10/5004* (2013.01); *H01M 10/613* (2015.04); *H01M 10/647* (2015.04)

(58) Field of Classification Search
CPC ............ H01M 2/0207; H01M 2/1061; H01M 2/1077; H01M 2/0245; H01M 10/5004; H01M 10/5032; H01M 10/613; H01M 10/647
See application file for complete search history.

(56) References Cited

U.S. PATENT DOCUMENTS

| 4,950,561 A | 8/1990 | Niksa et al. |
| 5,480,743 A | 1/1996 | Mccarter et al. |
| 5,487,958 A | 1/1996 | Tura |

(Continued)

FOREIGN PATENT DOCUMENTS

| JP | 2003346745 A | * 12/2003 |
| JP | 2003346749 A | 12/2003 |

(Continued)

OTHER PUBLICATIONS

International Search Report for International Patent Application PCT/KR2010/002333 dated Nov. 17, 2010.

*Primary Examiner* — Carlos Barcena
(74) *Attorney, Agent, or Firm* — Buckert Patent & Trademark Law Firm, PC; John F. Buckert

(57) ABSTRACT

A battery cell assembly in accordance with an exemplary embodiment is provided. The assembly includes a first frame member having a first plurality of tabs extending away from a first peripheral edge of the first frame member. Each tab of the first plurality of tabs has a first coupling feature at a distal end of the respective tab. The assembly further includes a second frame member having a plurality of slots extending into a second peripheral edge of the second frame member. The assembly further includes a battery cell disposed between the first and second frame members, and each first coupling feature of each tab of the first plurality of tabs is configured to engage a respective slot of the plurality of slots of the second frame member to fixedly hold the first and second frame members together.

7 Claims, 15 Drawing Sheets

(51) Int. Cl.
*H01M 10/647* (2014.01)
*H01M 10/613* (2014.01)

(56) References Cited

U.S. PATENT DOCUMENTS

| | | |
|---|---|---|
| 6,362,598 B2 | 3/2002 | Laig-Hoerstebrock et al. |
| 6,709,783 B2 | 3/2004 | Ogata et al. |
| 6,724,172 B2 | 4/2004 | Koo |
| 6,821,671 B2 | 11/2004 | Hinton et al. |
| 7,241,530 B2 | 7/2007 | Oogami |
| 7,250,741 B2 | 7/2007 | Koo et al. |
| 7,479,758 B2 | 1/2009 | Moon |
| 7,776,466 B2 | 8/2010 | Oh |
| 7,829,216 B2 | 11/2010 | Han et al. |
| 7,883,793 B2 | 2/2011 | Niedzwiecki et al. |
| 7,976,980 B2 | 7/2011 | Yoon et al. |
| 8,067,111 B2 | 11/2011 | Koetting et al. |
| 8,163,412 B2 | 4/2012 | Koetting et al. |
| 8,202,645 B2 | 6/2012 | Young |
| 8,309,248 B2 | 11/2012 | Koetting et al. |
| 2004/0016455 A1 | 1/2004 | Oogami |
| 2005/0123828 A1 | 6/2005 | Oogami et al. |
| 2006/0234119 A1 | 10/2006 | Kruger et al. |
| 2006/0286450 A1 | 12/2006 | Yoon et al. |
| 2007/0072066 A1 | 3/2007 | Yoon et al. |
| 2007/0141457 A1 | 6/2007 | Amagai |
| 2007/0207377 A1 | 9/2007 | Han et al. |
| 2008/0160395 A1* | 7/2008 | Okada et al. .................. 429/99 |
| 2009/0186265 A1 | 7/2009 | Koetting et al. |
| 2009/0246616 A1* | 10/2009 | Koyama et al. ............... 429/153 |
| 2010/0086842 A1 | 4/2010 | Yang |
| 2010/0266883 A1 | 10/2010 | Koetting et al. |

FOREIGN PATENT DOCUMENTS

| | | |
|---|---|---|
| JP | 2004055456 A | 2/2004 |
| JP | 2005122927 A | 5/2005 |
| JP | 2005259379 A | 9/2005 |
| JP | 2005268004 | 9/2005 |
| JP | 2006155962 A | 6/2006 |
| JP | 2008103248 A | 5/2008 |
| JP | 2009224271 | 10/2009 |
| KR | 20070012809 A | 1/2007 |
| KR | 100813812 B1 | 3/2008 |
| KR | 100904375 B1 | 6/2009 |
| KR | 100905393 B1 | 6/2009 |
| KR | 20090079802 | 7/2009 |
| KR | 100921346 B1 | 10/2009 |
| KR | 20100003139 | 1/2010 |
| KR | 20100039184 A | 4/2010 |
| WO | 2006059455 A | 6/2006 |
| WO | 2006093010 A | 9/2006 |
| WO | 2006101342 A | 9/2006 |
| WO | 2009061451 A1 | 5/2009 |
| WO | 2009103527 A | 8/2009 |

* cited by examiner

BATTERY CELL ASSEMBLIES

CROSS-REFERENCE TO RELATED APPLICATIONS

This application is a divisional of U.S. patent application Ser. No. 12/857,908 filed on Aug. 17, 2010 which claims priority to U.S. Provisional Patent Application No. 61/325,290 filed on Apr. 17, 2010, and the entire contents of both of these applications are hereby incorporated by reference herein.

BACKGROUND

This application relates generally to battery cell assemblies, and more particularly to a battery cell assemblies having frame members with retaining tabs.

SUMMARY

A battery cell assembly in accordance with an exemplary embodiment is provided. The assembly includes a first frame member having a first plurality of tabs extending away from a first peripheral edge of the first frame member. Each tab of the first plurality of tabs has a first coupling feature at a distal end of the respective tab. The assembly further includes a second frame member having a plurality of slots extending into a second peripheral edge of the second frame member. The assembly further includes a battery cell disposed between the first and second frame members, and each first coupling feature of each tab of the first plurality of tabs is configured to engage a respective slot of the plurality of slots of the second frame member to fixedly hold the first and second frame members together.

A frame member in accordance with another exemplary embodiment is provided. The frame member includes a rectangular ring-shaped portion having a plurality of tabs extending away from a peripheral edge of the rectangular ring-shaped portion. Each tab of the plurality of tabs has a coupling feature at a distal end of the respective tab. The rectangular ring-shaped portion further includes a plurality of slots extending into a peripheral edge of the rectangular ring-shaped portion. Each slot of the plurality of slots is proximate to a respective tab of the plurality of tabs.

A battery cell assembly in accordance with another exemplary embodiment is provided. The assembly includes a first frame member having a first plurality of tabs extending away from a first peripheral edge of the first frame member in a first direction. Each tab of the first plurality of tabs has an aperture extending therethrough. The first frame member further includes a first plurality of coupling members extending from an inner region of the first frame member and having distal ends proximate to the first peripheral edge. Each coupling member of the first plurality coupling members extends generally perpendicular to a respective tab of the first plurality of tabs that is disposed proximate to the respective coupling member. The assembly further includes a second frame member having a second plurality of tabs extending away from a second peripheral edge of the second frame member in the first direction. Each tab of the second plurality of tabs has an aperture extending therethrough. The assembly further includes a battery cell disposed between the first and second frame members, and each tab of the second plurality of tabs of the second frame member is configured to engage a respective coupling member of the first plurality coupling members to fixedly hold the first and second frame members together.

A frame member in accordance with another exemplary embodiment is provided. The frame member includes a rectangular ring-shaped portion having a plurality of tabs extending away from a peripheral edge of the rectangular ring-shaped portion in a first direction. Each tab of the plurality of tabs has an aperture extending therethrough. The rectangular ring-shaped portion further includes a plurality of coupling members extending from an inner region of the rectangular ring-shaped portion and having distal ends proximate to the peripheral edge. Each coupling member of the plurality coupling members extend generally perpendicular to a respective tab of the plurality of tabs that is disposed proximate to the respective coupling member.

These and other advantages and features will become more apparent from the following description taken in conjunction with the drawings.

DETAILED DESCRIPTION

Figure 1:
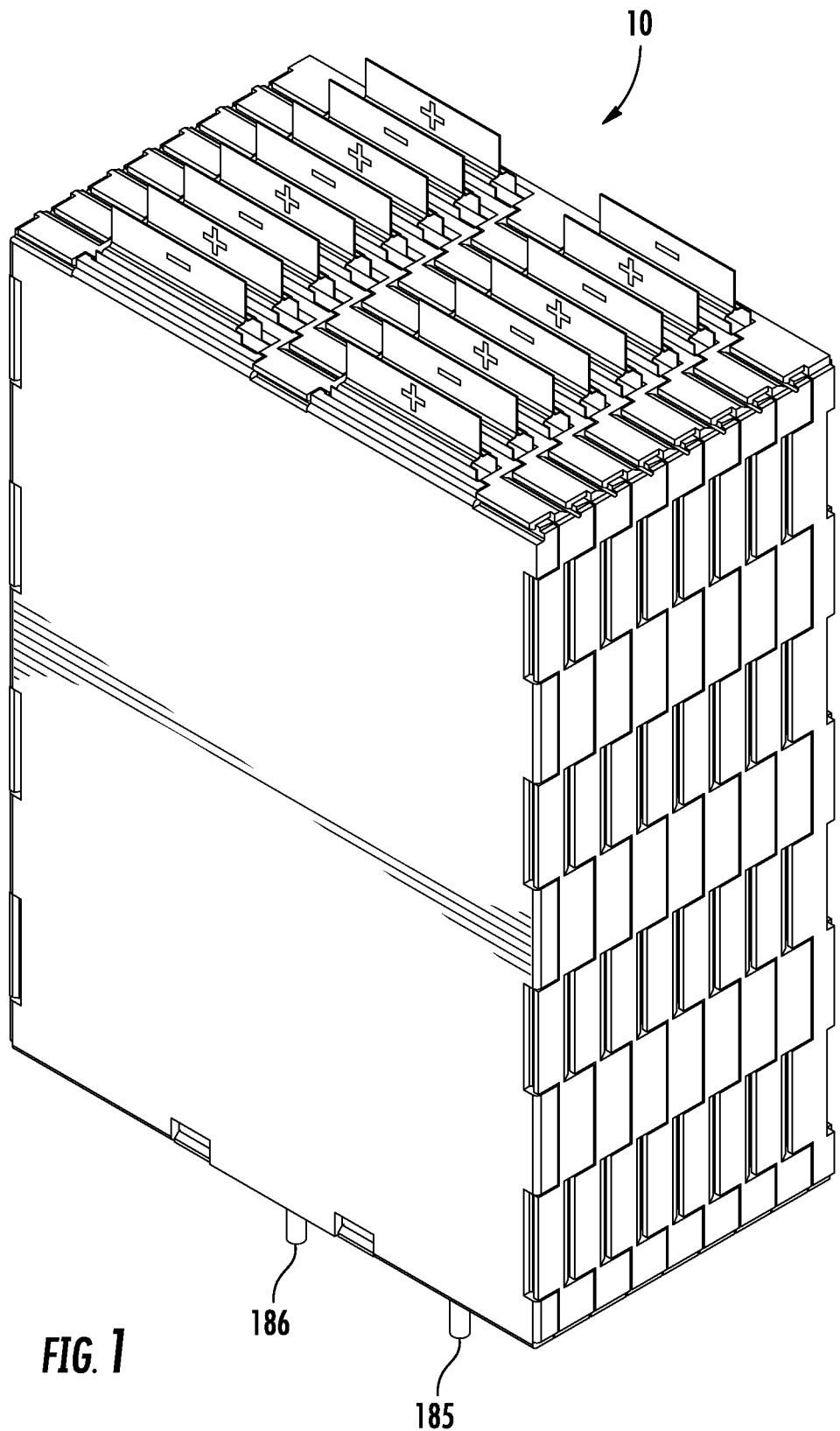
FIG. 1 is an isometric view of a battery module in accordance with an exemplary embodiment.

Referring to FIG. 1, a battery module 10 in accordance with an exemplary embodiment is illustrated. The battery module 10 is configured to provide electrical power to either a primary drive train of the vehicle or an auxiliary drive train of a vehicle. For purposes of discussion, only a portion of the battery module 10 will be described in greater detail below. In particular, referring to FIG. 2, the battery module 10 includes in part, a battery cell assembly 18 and a battery cell assembly 20.

Referring to FIGS. 1-9, the battery cell assembly 18 includes frame members 22, 24, battery cells 26, 28, and a cooling manifold or fin 30. The battery cell assembly 20 includes frame members 24, 32, battery cells 34, 36 and a cooling manifold 38. For purposes of simplicity, only the battery cell assembly 18 will be discussed in further detail below.

The frame members 22, 24 are configured to be coupled together to hold the battery cells 26, 28 and the cooling fin 30 therebetween, as will be discussed in greater detail below.

Referring to FIGS. 3-8, the frame member 22 includes a rectangular ring-shaped portion or body 50 and tabs 52, 54, 56, 58, 60, 62, 64, 66, 68, 70, 72, 74, 76. The tabs 52-76 extend away from a peripheral edge 90 of the rectangular ring-shaped portion 50 in a first direction. In an alternative embodiment, the frame member 22 could have a greater number of tabs or a lesser number of tabs than those tabs shown. The rectangular ring-shaped portion 50 includes a plurality of slots 152, 154, 156, 158, 160, 162, 164, 166, 168, 170, 172, 174 extending into the peripheral edge 90 that are disposed proximate to the tabs 52, 54, 56, 58, 60, 62, 64, 66, 68, 70, 72, 74, 76, respectively. Further, the rectangular ring-shaped portion 50 has apertures 180, 182, 184 extending therethrough to allow an inlet fluid conduit 185 and an outlet fluid conduit 186 to be fluidly coupled to the cooling manifolds 30, 38. In one exemplary embodiment, the frame member 20 is constructed of plastic. Of course, in alternative embodiments, the frame member 22 could be constructed of other materials known to those skilled in the art.

Figure 8:
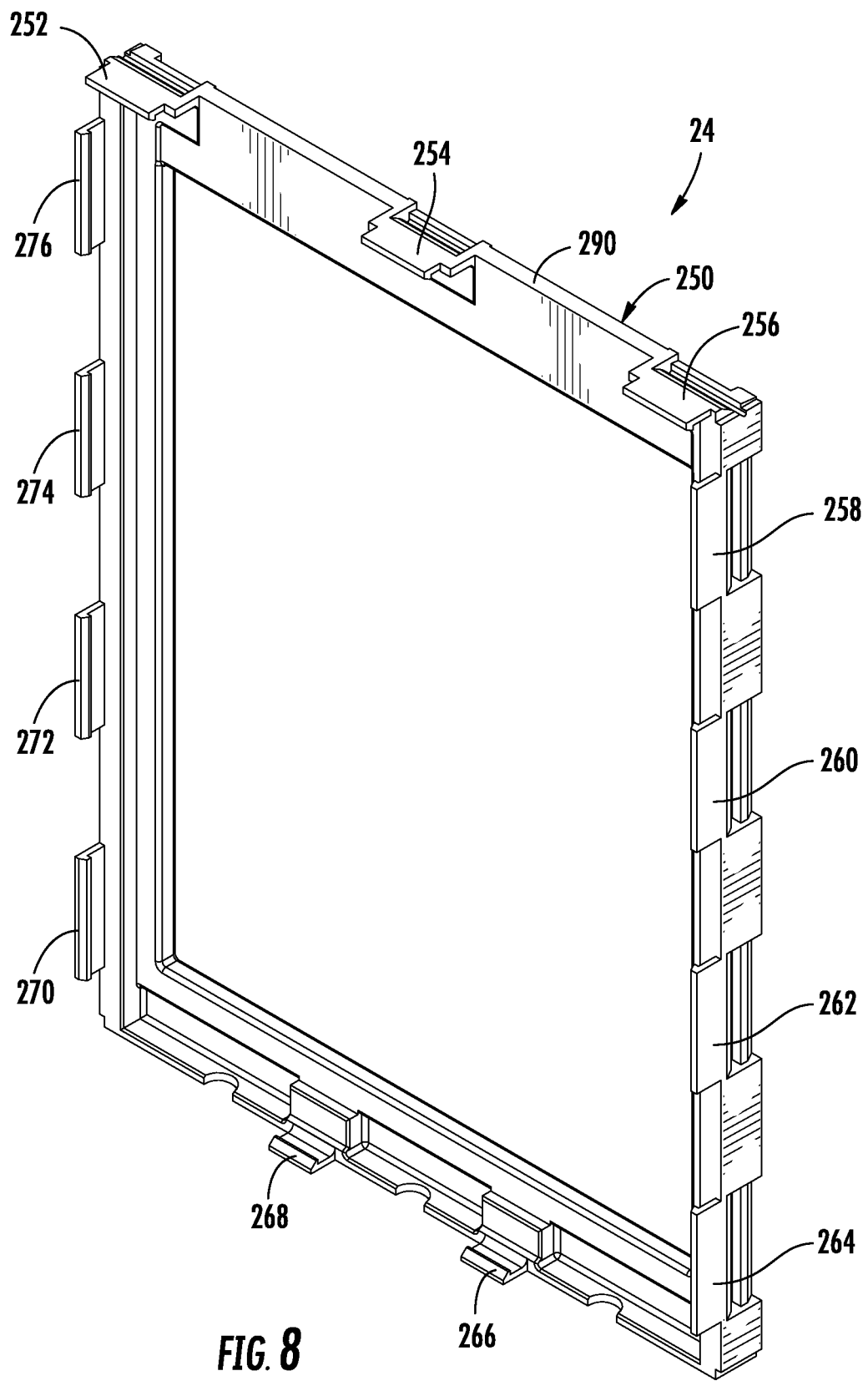
FIG. 8 is an isometric view of another frame member utilized in the battery module of FIG. 1.

Referring to FIG. 8, the frame member 24 has an identical structure as the frame member 22. Accordingly, only a portion of the components of the frame member 24 will be discussed below. In particular, the frame member 24 includes a rectangular ring-shaped portion or body 250 and tabs 252, 254, 256, 258, 260, 262, 264, 266, 268, 270, 272, 274, 276. The tabs 252-76 extend away from a peripheral edge 290 of the rectangular ring-shaped portion 250 in a first direction.

Figure 7:
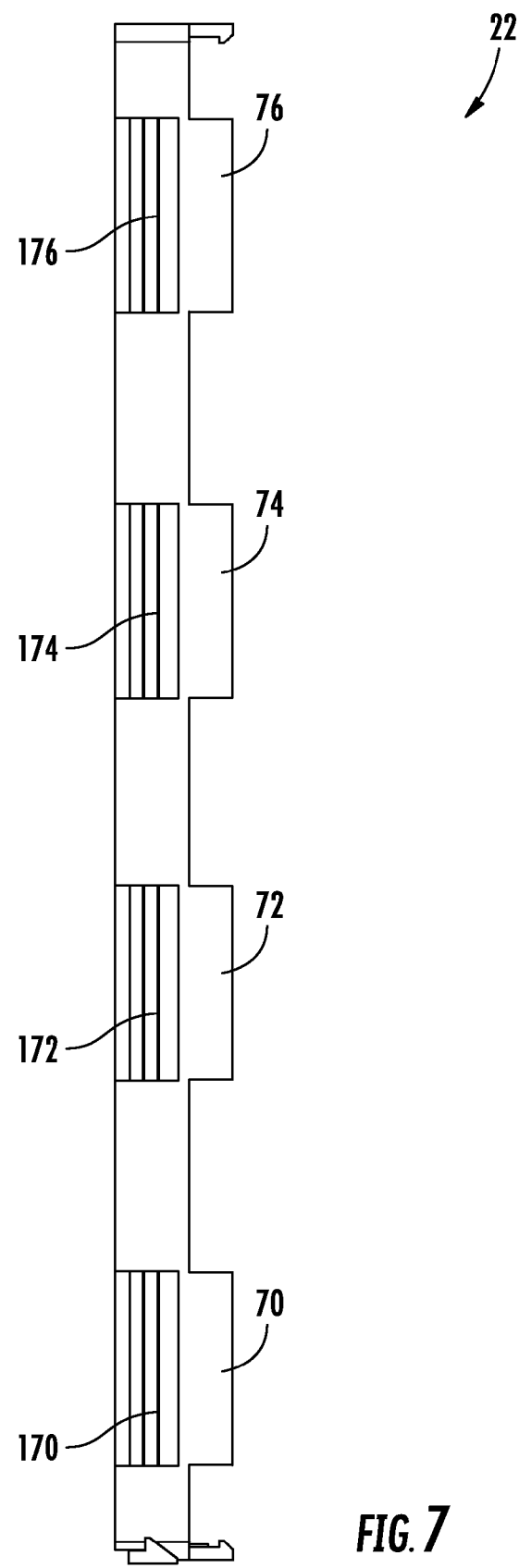
FIG. 7 is a side view of the frame member of FIG. 3.
Figure 9:
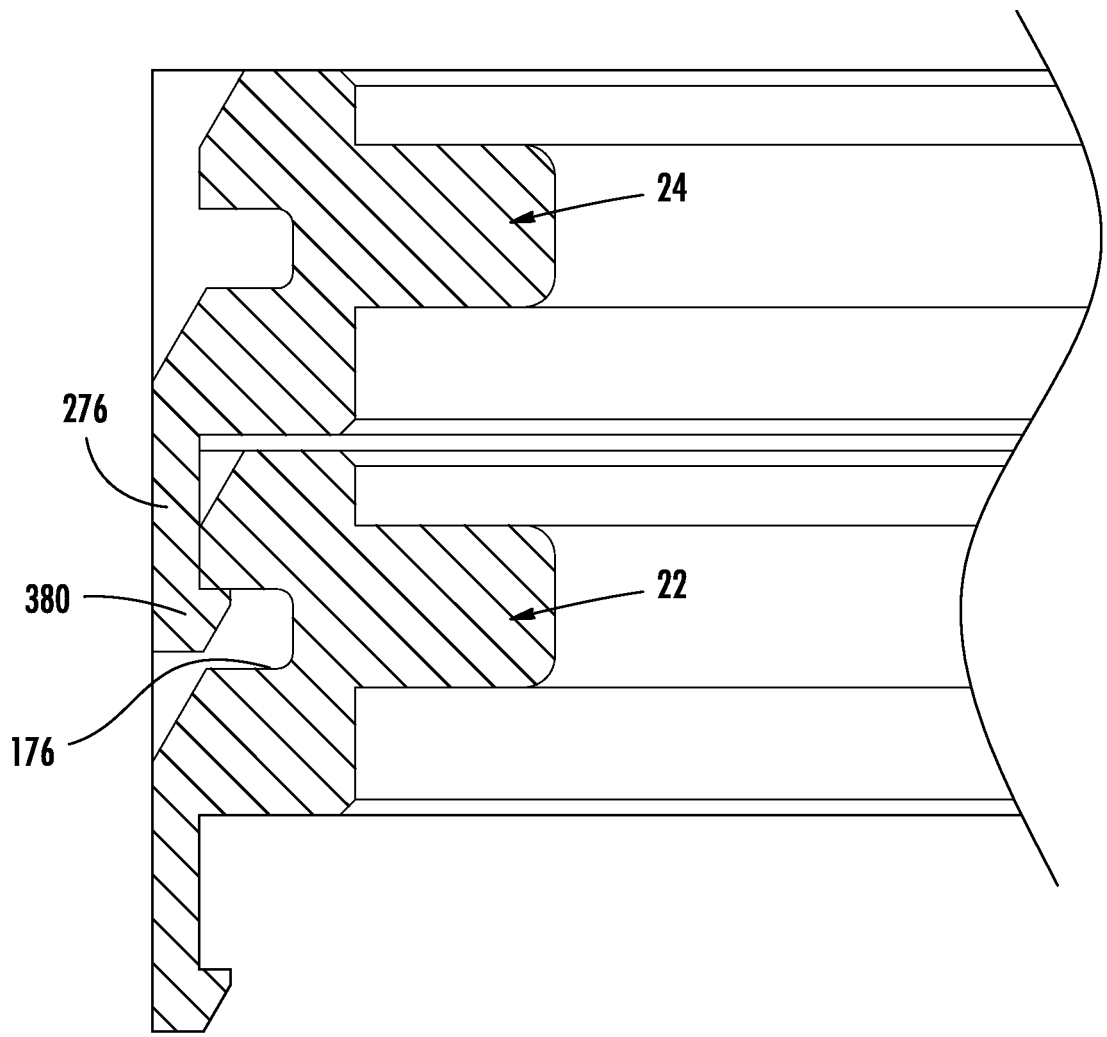
FIG. 9 is an enlarged cross-sectional view of a portion of the frame members of FIGS. 3 and 8, respectively, when the frame members are coupled together.

Referring to FIGS. 7-9, an explanation of how portions of the frame members 22, 24 are coupled together will be provided before explaining the coupling together of the frame members 22, 24 in their entirety. As shown, the frame member 24 has a tab 276 with a coupling feature 380 disposed of the distal end of the tab 276. The coupling feature 380 is configured to be received in a portion of the slot 176 in the frame member 22 to obtain a snap-fit engagement between the frame members 22, 24. It should be noted that each of the tabs in the frame members 24, 26 have a coupling feature similar to the coupling feature 380.

Figure 2:
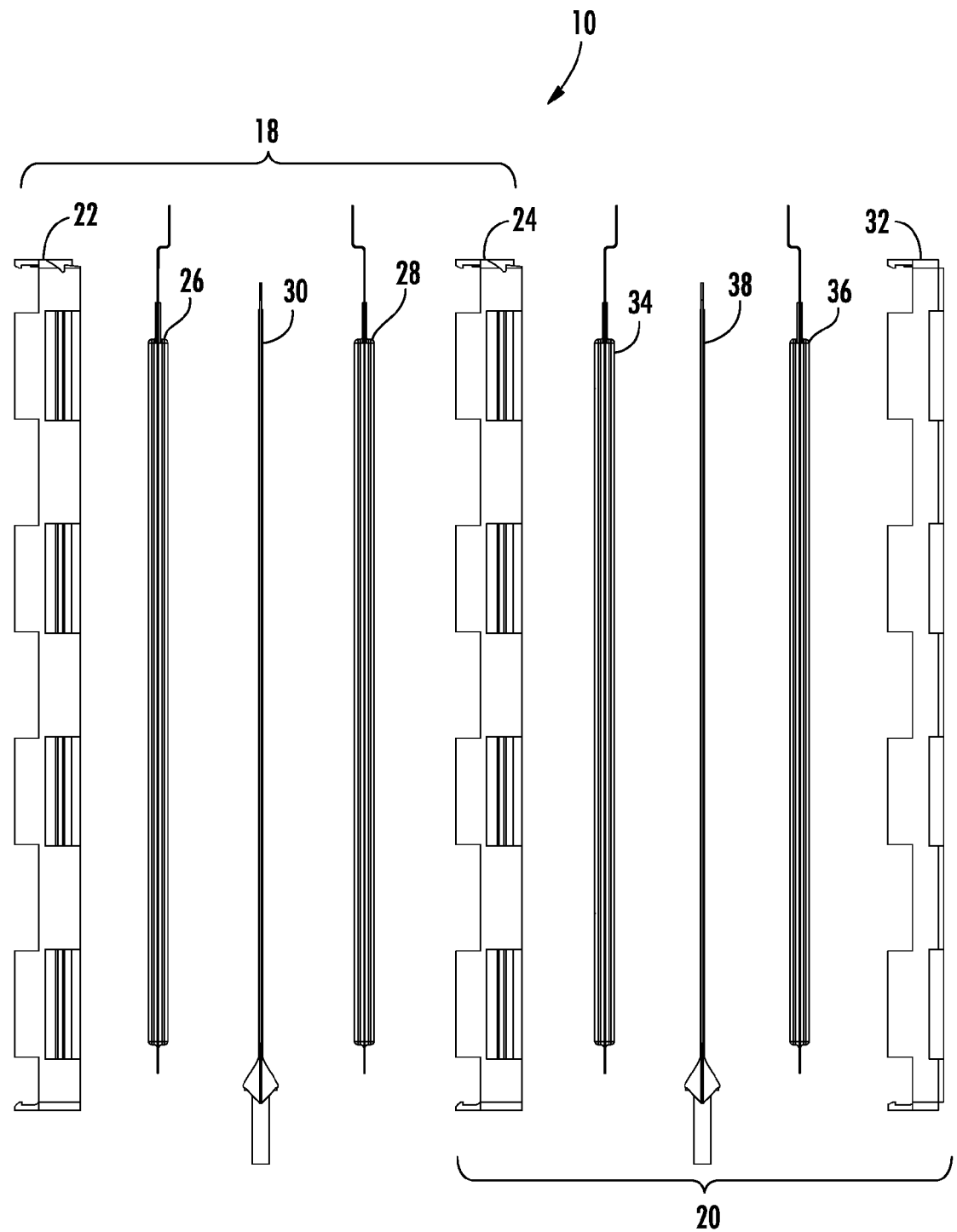
FIG. 2 is an exploded view of a portion of the battery module of FIG. 1.
Figure 3:
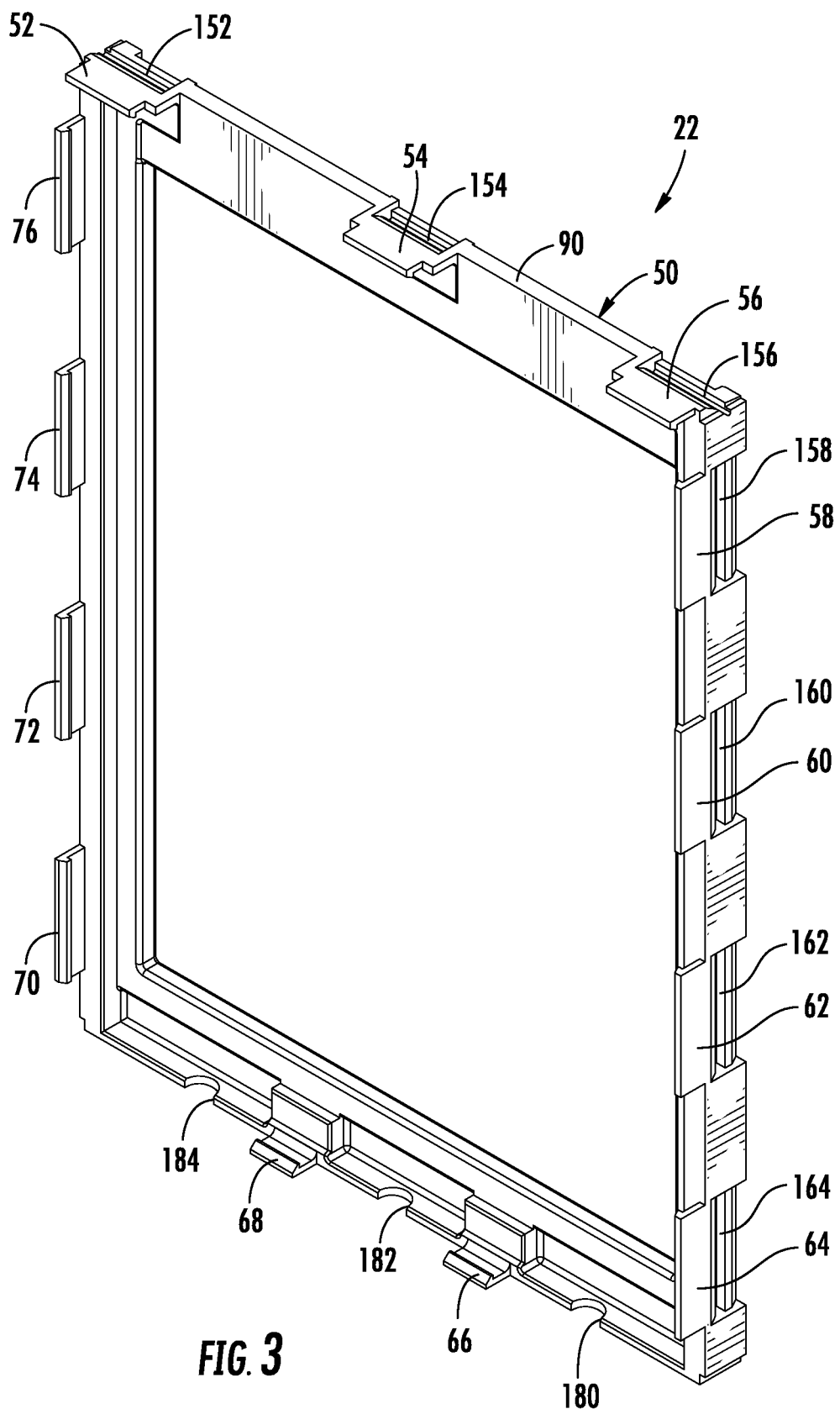
FIG. 3 is an isometric view of a frame member utilized in the battery module of FIG. 1.
Figure 4:
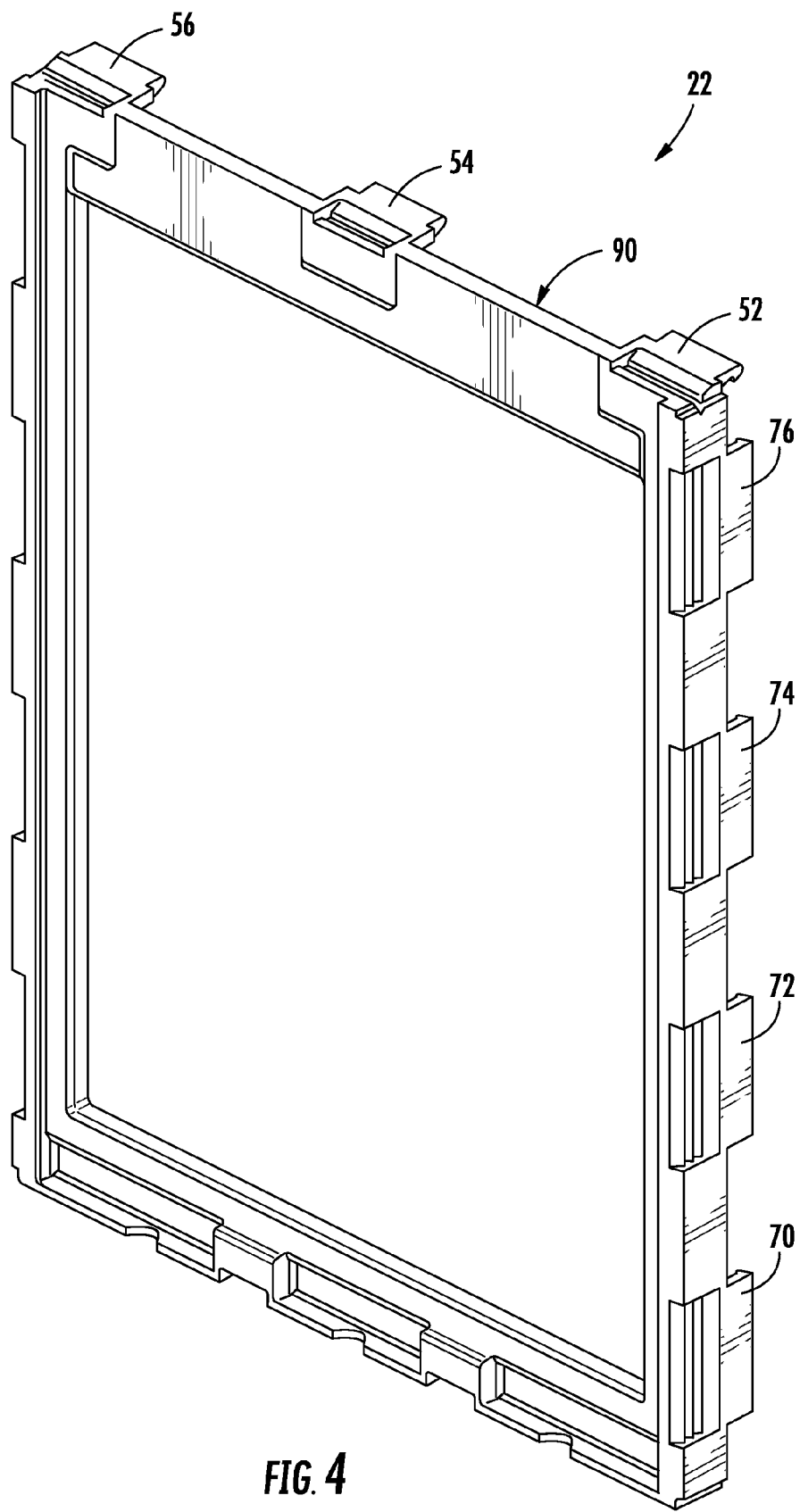
FIG. 4 is another isometric view of the frame member of FIG. 3.
Figure 5:
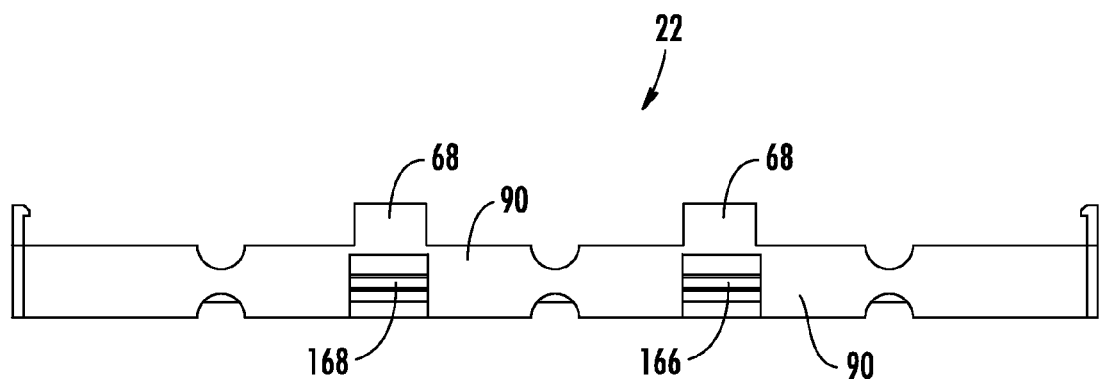
FIG. 5 is a bottom view of the frame member of FIG. 3.
Figure 6:
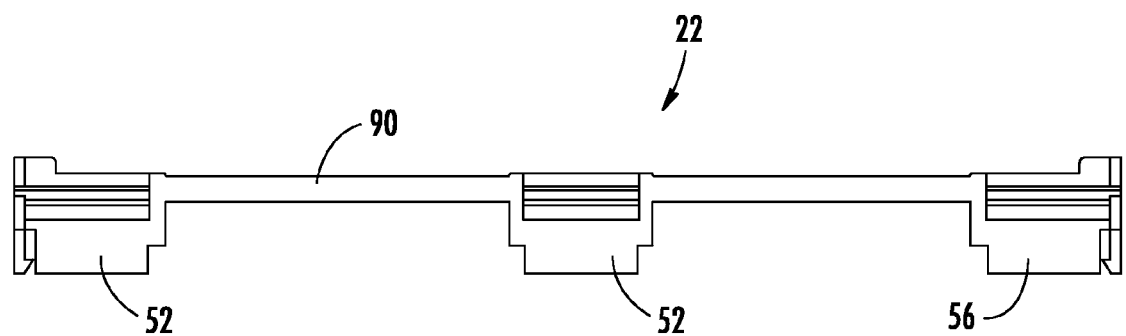
FIG. 6 is a top view of the frame member of FIG. 3.

Referring to FIGS. 2, 3 and 8, the battery cell assembly 18 is coupled together by disposing the battery cells 26, 28 and the cooling fin 30 between the frame members 22, 24, and then positioning the frame members 22, 24 adjacent to one another such that the coupling features of the tabs 252, 254, 256, 258, 260, 262, 264, 266, 268, 270, 272, 274, 276 of the frame member 24 engage the slots 152, 154, 156, 158, 160, 162, 164, 166, 168, 170, 172, 174, respectively, of the frame member 22 to fixedly hold the frame members 22, 24 together.

Referring to FIG. 1, in an exemplary embodiment the battery cells 26, 28 are lithium-ion pouch-type battery cells. Of course, other types of battery cells known to those skilled in the art could be utilized.

Referring to FIG. 2, the cooling fin 30 is configured to receive a coolant or fluid that flows through the manifold 30 to extract heat energy from the battery cells 26, 28. As shown, in one exemplary embodiment, the cooling fin 30 is disposed between the battery cells 26, 28.

Figure 10:
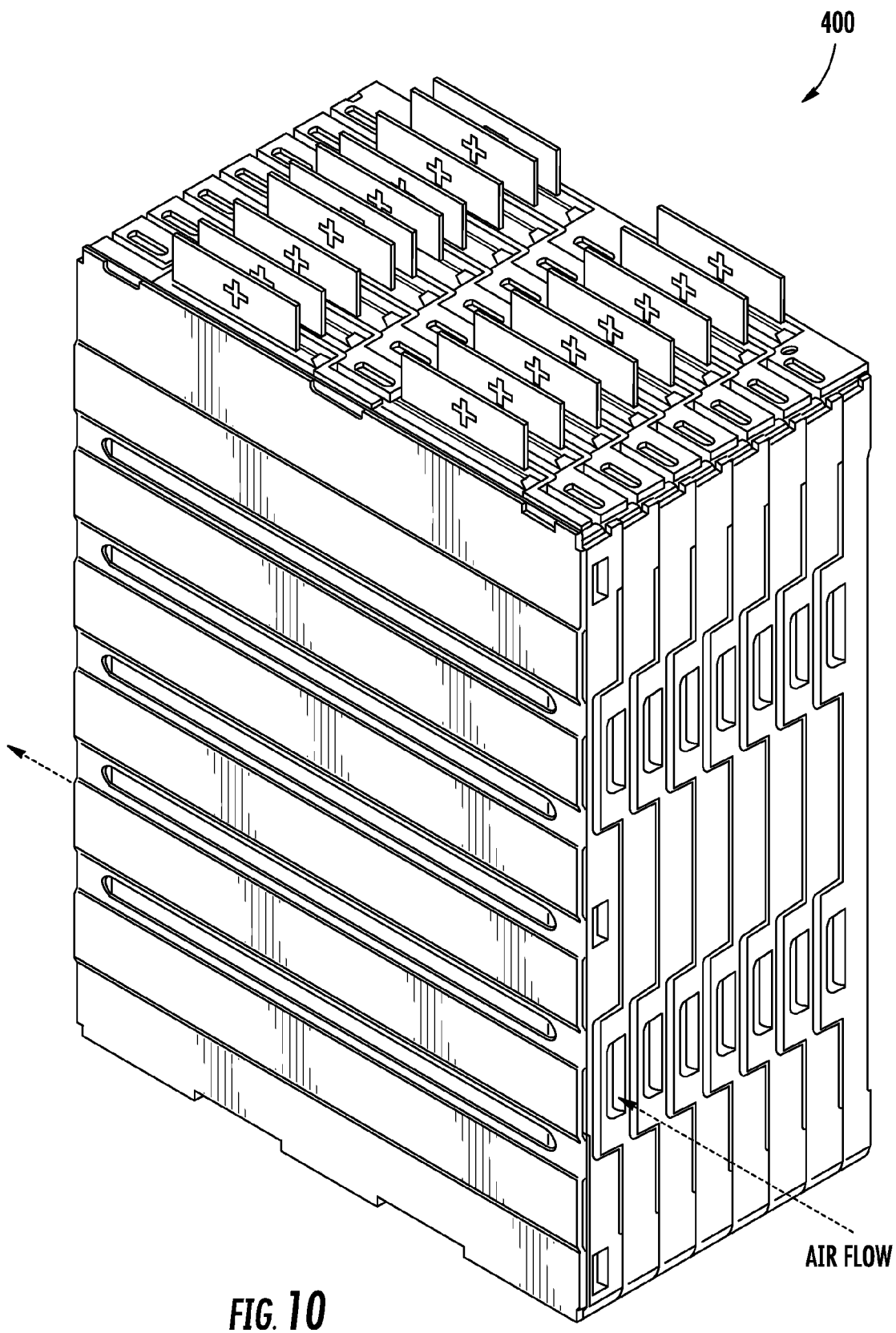
FIG. 10 is an isometric view of another battery module in accordance with another exemplary embodiment.

Referring to FIG. 10, a battery module 400 in accordance with another an exemplary embodiment is illustrated. The battery module 400 is configured to provide electrical power to either a primary drive train of the vehicle or an auxiliary drive train of a vehicle. For purposes of discussion, only a portion of the battery module 400 will be described in greater detail below. In particular, referring to FIG. 11, the battery module 400 includes in part, a battery cell assembly 410.

Referring to FIGS. 10-17, the battery cell assembly 410 includes frame members 422, 424, battery cells 426, 428, and a compressible spacer 430. An advantage of the battery cell assembly 410 is that the assembly 410 utilizes frame members having tabs with apertures extending therethrough wherein the tabs are utilized to couple adjacent frame members together and to allow air flow through the apertures to cool battery cells within the battery cell assembly 410.

The frame members 422, 424 are configured to be coupled together to hold the battery cells 426, 428 and the compressible spacer 430 therebetween, as will be discussed in greater detail below.

Referring to FIGS. 12-15, the frame member 422 includes a rectangular ring-shaped portion or body 429, tabs 452, 454, 456, 458, 460, 462, 464, 466, 468, 470, 472, cross-members 700, 702, 704, 706, 708 and a spacer portion 720. The tabs 452, 454, 456, 458, 460, 462, 464, 466, 468, 470, 472 include apertures 552, 554, 556, 558, 560, 562, 564, 568, 570, 572, respectively, extending therethrough. Further, the tabs 452-472 extend away from a peripheral edge 590 of the rectangular ring-shaped portion 429 in a first direction. The rectangular ring-shaped portion 429 includes coupling members 652, 654, 656, 658, 660, 662, 664, 668, 670, 672 extending from the inner region of the rectangular ring-shaped portion 429 that have distal ends proximate to the peripheral edge 5900. The coupling members 652-672 extend generally perpendicular to the tabs 452-472, respectively, that are disposed proximate to the coupling members 652-672, respectively.

In one exemplary embodiment, the rectangular ring-shaped portion 429 defines an open region 431. The cross-members 700, 702, 704, 706, 708 extend across the open region 431 that are coupled to opposite sides of the rectangular ring-shaped portion 429.

The spacing between the cross-members 700, 702 and the positioning of the tabs 458, 472 that allows air flow through a portion of the open region 431 will be explained. As shown, the tabs 458 and 472 are disposed on first and second sides, respectively, of the rectangular ring-shaped portion 429 and extend in the first direction. The tab 458 has leg portions 990, 992 extending parallel to one another and a bridging portion 994 disposed between the leg portions 990, 992 such that the aperture 558 is defined within the tab 458. The tab 472 has leg portions 1010, 1012 extending parallel to one another and a bridging portion 1014 disposed between the leg portions 1010, 1012 such that the aperture 572 is defined within the tab 472. The cross-members 700, 702 are disposed parallel to one another and apart from one another such that a gap is formed therebetween in the open region 431. A centerline 1024 extending through the cross-member 700 is co-planar with centerlines 996, 1016 extending through the leg portions 990, 1010, respectively. Further, a centerline 1026 extending through the cross-member 702 is co-planar with centerlines 998, 1018 extending through the leg portions 992, 1012, respectively, such that air flow occurs through the aperture 558 and through a gap between the cross-members 700, 702 and further through the aperture 572.

Figure 15:
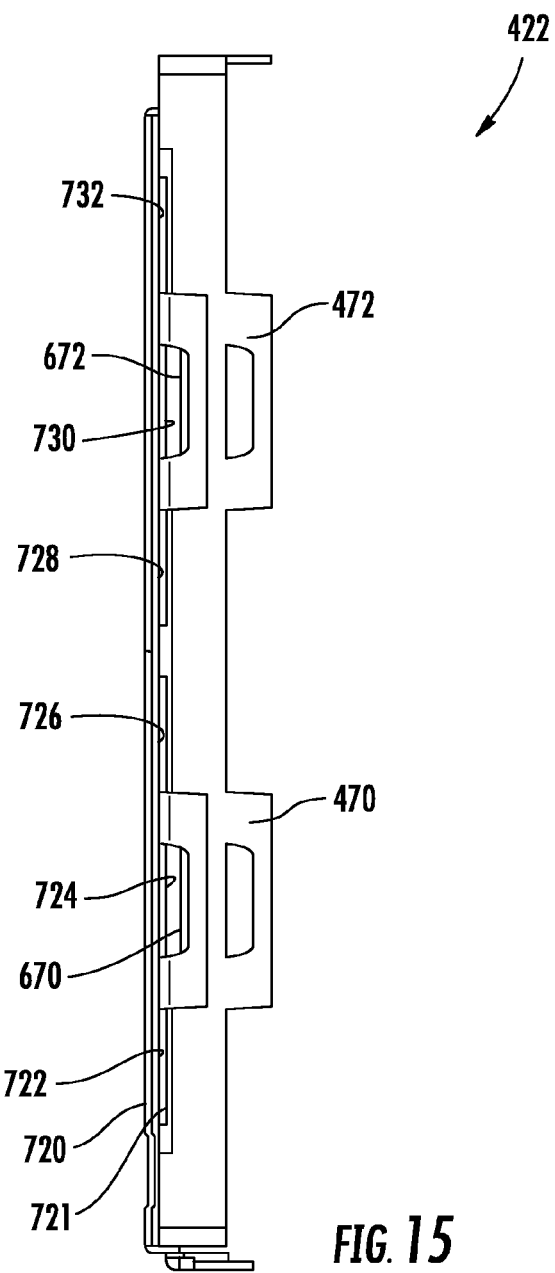
FIG. 15 is a side view of the frame member of FIG. 12.

Referring to FIG. 15, the spacer portion 720 extends away from a rear surface 721 of the frame member 422. The spacer portion 720 defines holes 722, 724, 726, 728, 730, 732 (and other holes not shown on an opposite side of the frame assembly 422) that allow the airflow therethrough into the open region 431 defined by the frame member 422 for cooling the battery cells 426, 428.

In one exemplary embodiment, the frame member 422 is constructed of plastic. Of course, in alternative embodiments, the frame member 422 could be constructed of other materials known to those skilled in the art.

Figure 12:
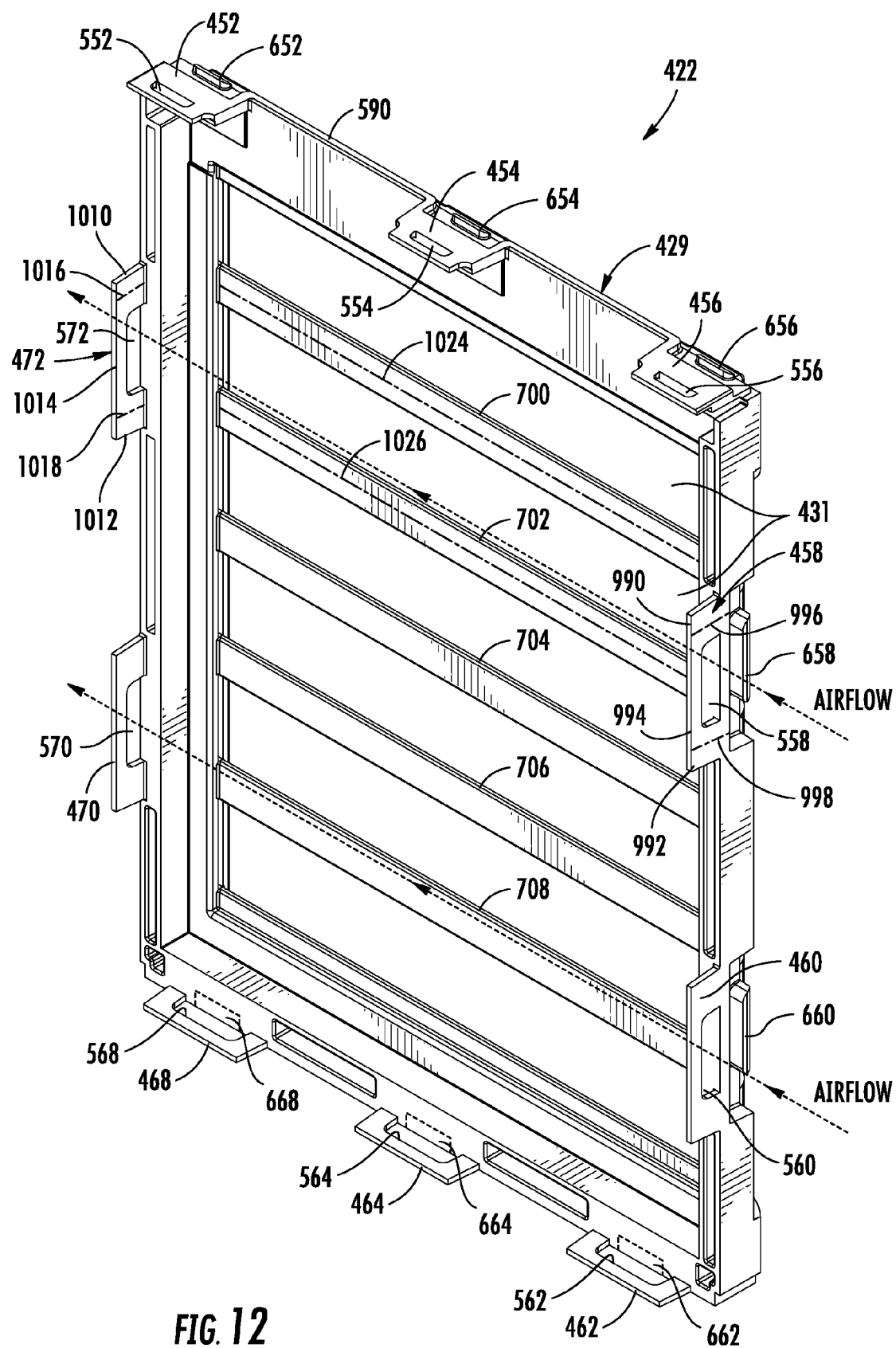
FIG. 12 is an isometric view of a frame member utilized in the battery module of FIG. 10.
Figure 13:
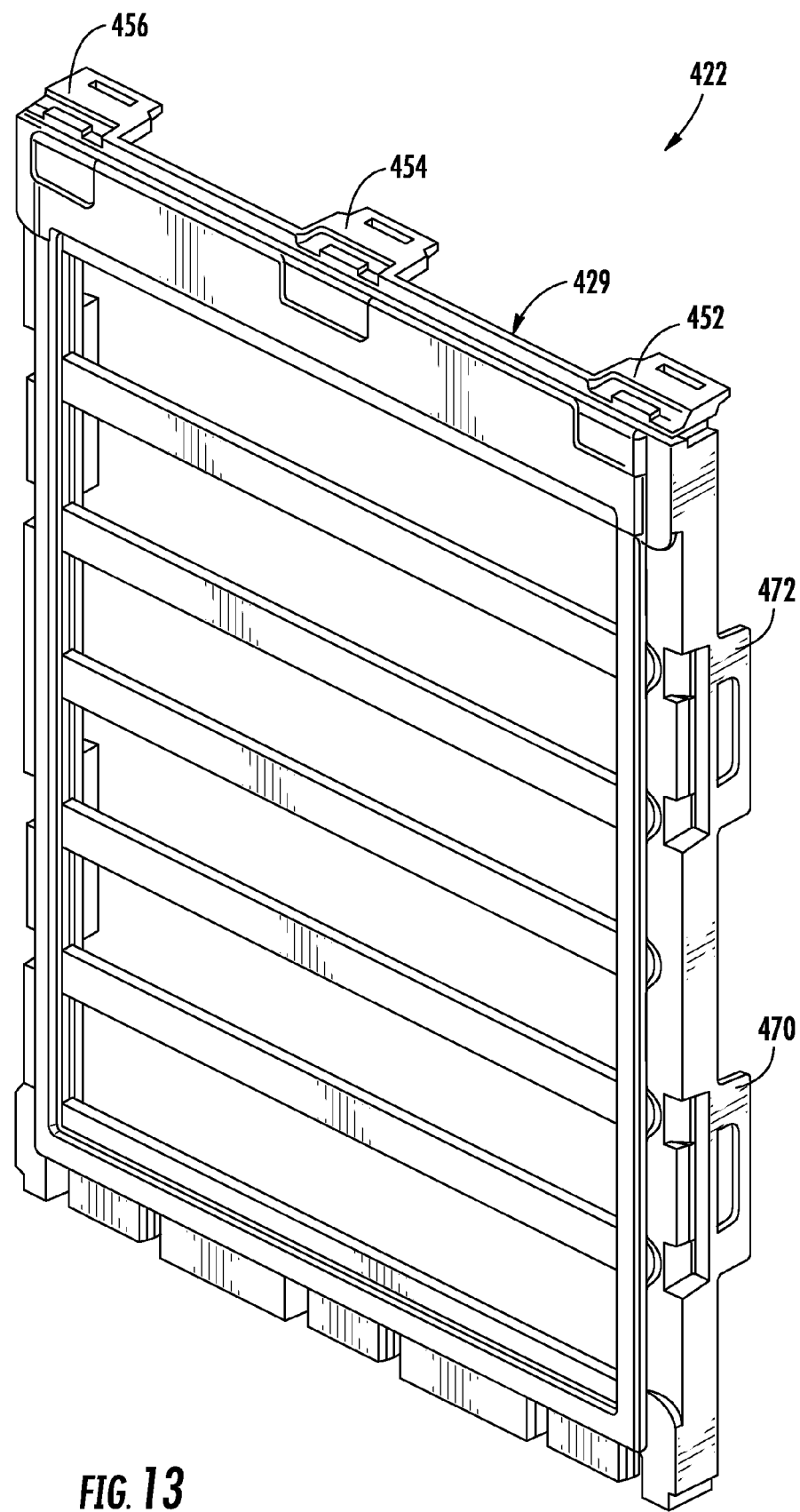
FIG. 13 is another isometric view of the frame member of FIG. 12.
Figure 14:
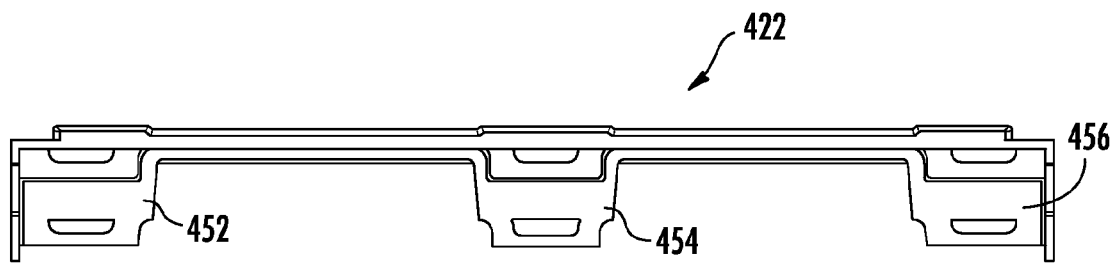
FIG. 14 is a top view of the frame member of FIG. 12.
Figure 16:
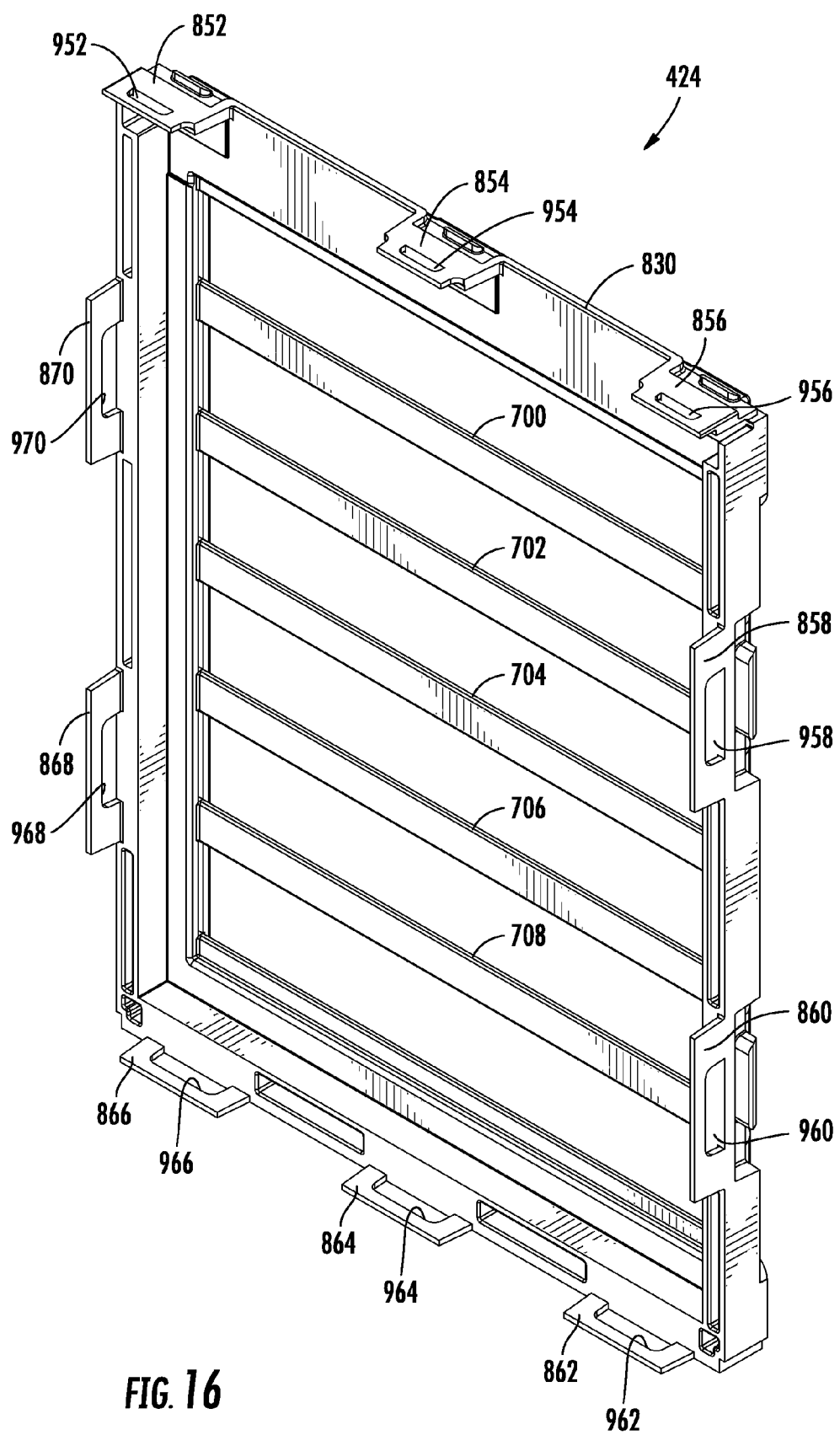
FIG. 16 is an isometric view of another frame member utilized in the battery module of FIG. 19.

Referring to FIGS. 12 and 16, the frame member 424 has an identical structure as the frame member 422. Accordingly, only a portion of the components of the frame member 424 will be discussed below. In particular, the frame member 424 includes a rectangular ring-shaped portion or body 830 and tabs 852, 854, 856, 858, 860, 862, 864, 866, 868, 870. The tabs 852, 854, 856, 858, 860, 862, 864, 866, 868, 870 have apertures 952, 954, 956, 958, 960, 962, 964, 966, 968, 970, respectively, extending therethrough.

Figure 17:
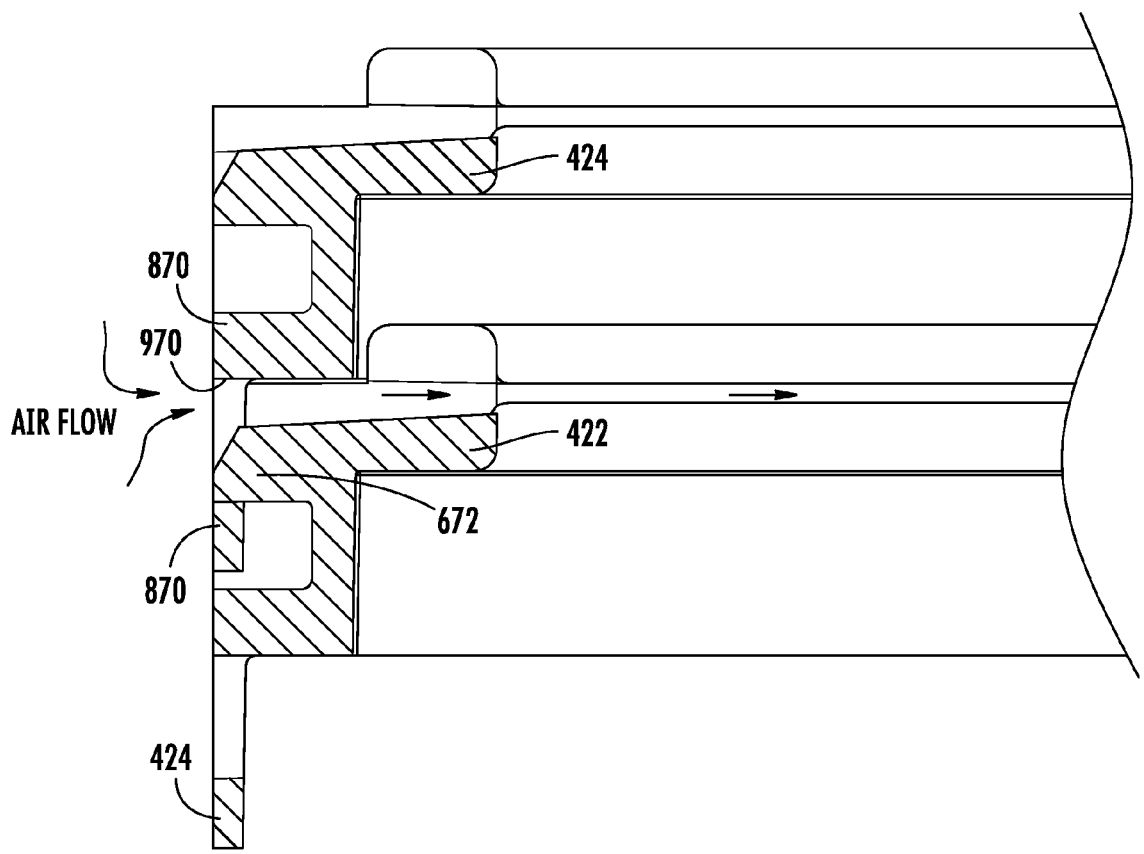
FIG. 17 is an enlarged cross-sectional view of a portion of the frame members of FIGS. 12 and 16, respectively, when the frame members are coupled together.

Referring to FIGS. 15, 16 and 17, an explanation of how portions of the frame members 422, 424 are coupled together will be provided before explaining the coupling together of the frame members 422, 424 in their entirety. As shown, the frame member 424 has a tab 870 with an aperture 970 disposed therethrough. The coupling member 672 of the frame member 422 is configured to be received in the aperture 970 of the frame member 424 to obtain a snap-fit engagement between the frame members 422, 424.

Figure 11:
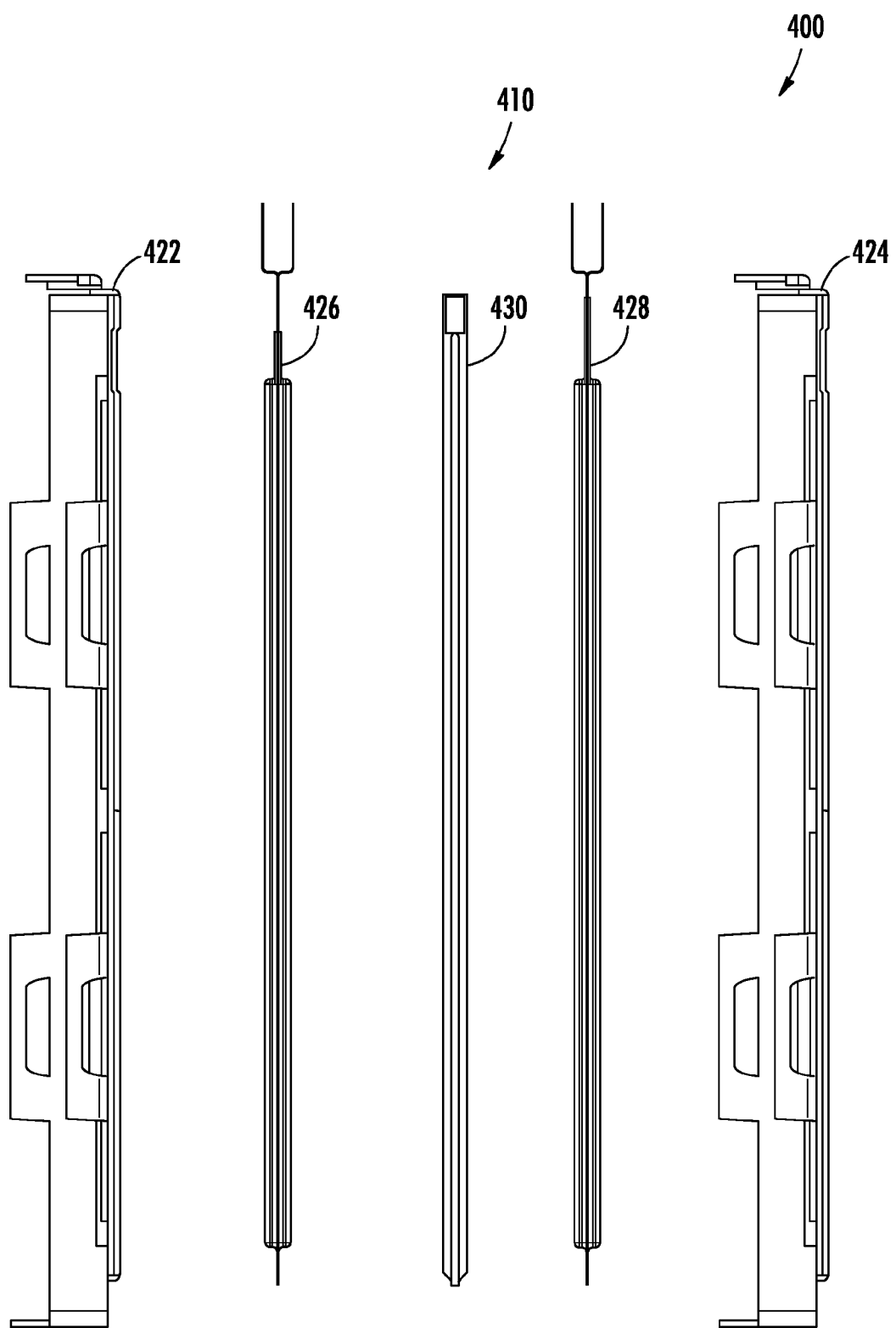
FIG. 11 is an exploded view of a portion of the battery module of FIG. 10.

Referring to FIGS. 11, 12 and 16, the battery cell assembly 410 is coupled together by disposing the battery cells 426, 428 and the compressible spacer 430 between the frame members 422, 424, and then positioning the frame members 422, 424 adjacent to one another such that the tabs 852-870 of the frame member 424 engage the coupling members 652-672, respectively, of the frame member 424 to fixedly hold the frame members 422, 424 together.

Referring to FIG. 11, in an exemplary embodiment the battery cells 426, 428 are lithium-ion pouch-type battery cells. Of course, other types of battery cells known to those skilled in the art could be utilized.

Further, the compressible spacer 430 is configured to bias the battery cells 426, 428 away from the spacer 430 such that the battery cells 426, 428 are firmly held between the frame members 422, 424.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

We claim:

1. A frame member, comprising:
   a rectangular ring-shaped portion having a plurality of tabs extending away from a peripheral edge of the rectangular ring-shaped portion in a first direction, each tab of the plurality of tabs having an aperture extending therethrough such that air flows through each aperture, the rectangular ring-shaped portion further having a plurality of coupling members extending from an inner region of the rectangular ring-shaped portion and having distal ends proximate to the peripheral edge, each coupling member of the plurality coupling members extending generally perpendicular to a respective tab of the plurality of tabs that is disposed proximate to the respective coupling member.

2. The frame member of claim 1, wherein the rectangular ring-shaped portion further includes a spacer portion extending away from a rear surface of the rectangular ring-shaped portion, the spacer portion defining a plurality of holes for allowing air flow therethrough into an open region defined by the rectangular ring-shaped portion.

3. The frame member of claim 1, wherein the frame member has first and second tabs of the plurality of tabs disposed on first and second sides, respectively, of the rectangular ring-shaped portion and extending in the first direction;
   the first tab having first and second leg portions extending parallel to one another and a first bridging portion disposed between the first and second leg portions such that a first aperture is defined within the first tab;
   the second tab having third and fourth leg portions extending parallel to one another and a second bridging portion disposed between the third and fourth leg portions such that a second aperture is defined within the second tab; and
   the frame member further having first and second cross-members disposed across an open region defined by the rectangular ring-shaped portion, the first and second cross-members being disposed parallel to one another and apart from one another, wherein a centerline extending through the first cross-member is co-planar with first and second centerlines extending through the first and third leg portions, respectively, and a centerline extending through the second cross-member is co-planar with second and fourth centerlines extending through the second and fourth leg portions, respectively, such that the air flows through the first aperture and through a gap between the first and second cross-members and further through the second aperture.

4. A battery cell assembly, comprising:
   a first frame member having a first plurality of tabs extending away from a first peripheral edge of the first frame member in a first direction, each tab of the first plurality of tabs having an aperture extending therethrough such that air flows through each aperture, the first frame member further having a first plurality of coupling members extending from an inner region of the first frame member and having distal ends proximate to the first peripheral edge, each coupling member of the first plurality coupling members extending generally perpendicular to a respective tab of the first plurality of tabs that is disposed proximate to the respective coupling member;
   a second frame member having a second plurality of tabs extending away from a second peripheral edge of the second frame member in the first direction, each tab of the second plurality of tabs having an aperture extending therethrough; and
   a battery cell disposed between the first and second frame members, and each tab of the second plurality of tabs of the second frame member is configured to engage a respective coupling member of the first plurality coupling members to fixedly hold the first and second frame members together.

5. The battery cell assembly of claim 4, wherein the second frame member further includes a second plurality of coupling members extending from an inner region of the second frame member and having distal ends proximate to the second peripheral edge, each coupling member of the second plurality coupling members extending generally perpendicular to a respective tab of the second plurality of tabs disposed proximate to the respective coupling member.

6. The battery cell assembly of claim 4, wherein the first frame member further includes a spacer portion extending away from a rear surface of the first frame member, the spacer portion defining a plurality of holes for allowing air flow therethrough into an open region defined by the first frame member.

7. The battery cell assembly of claim 4, wherein the second frame member has a rectangular ring-shaped portion having first and second tabs of the second plurality of tabs disposed on first and second sides, respectively, of the rectangular ring-shaped portion and extending in the first direction;
- the first tab having first and second leg portions extending parallel to one another and a first bridging portion disposed between the first and second leg portions such that a first aperture is defined within the first tab;
- the second tab having third and fourth leg portions extending parallel to one another and a second bridging portion disposed between the third and fourth leg portions such that a second aperture is defined within the second tab;
- the second frame member further having first and second cross-members disposed across an open region defined by the rectangular ring-shaped portion, the first and second cross-members being disposed parallel to one another and apart from one another, wherein a centerline extending through the first cross-member is co-planar with first and second centerlines extending through the first and third leg portions, respectively, and a centerline extending through the second cross-member is co-planar with second and fourth centerlines extending through the second and fourth leg portions, respectively, such that the air flows through the first aperture and through a gap between the first and second cross-members and further through the second aperture.

* * * * *